(12) United States Patent
Liu et al.

(10) Patent No.: US 12,450,095 B2
(45) Date of Patent: Oct. 21, 2025

(54) METHOD AND SYSTEM FOR PROCESSING OFFLOADING TASKS OF UNMANNED AERIAL VEHICLE BASED ON EDGE COMPUTING SCENARIO

(71) Applicant: Guangdong University of Technology, Guangzhou (CN)

(72) Inventors: Yi Liu, Guangzhou (CN); Zhiheng Wang, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 19/017,861

(22) Filed: Jan. 13, 2025

(65) Prior Publication Data

US 2025/0251982 A1    Aug. 7, 2025

(30) Foreign Application Priority Data

Feb. 7, 2024  (CN) .......................... 202410174286.9

(51) Int. Cl.
  *G06F 9/50* (2006.01)
(52) U.S. Cl.
  CPC .................. *G06F 9/5027* (2013.01)
(58) Field of Classification Search
  CPC ................................................... G06F 9/5027
  See application file for complete search history.

(56) References Cited

U.S. PATENT DOCUMENTS

2019/0045580 A1\* 2/2019 Chai ................ H04W 84/22
2022/0124543 A1\* 4/2022 Orhan ................ G06N 3/08
(Continued)

FOREIGN PATENT DOCUMENTS

CN  115297013 A    11/2022
CN  116723549 A  *  9/2023
CN  114003058 B  *  1/2024  ............ G05D 1/101

OTHER PUBLICATIONS

Wu et al., "Energy efficient for UAV-enabled mobile edge computing networks: Intelligent task prediction and offloading," Computer Communications, vol. 150, pp. 556-562, 2020. (Year: 2020).*
(Continued)

*Primary Examiner* — Lewis A Bullock, Jr.
*Assistant Examiner* — Kevin X Lu
(74) *Attorney, Agent, or Firm* — Hemisphere Law, PLLC; Zhigang Ma

(57) ABSTRACT

A method and a system for processing offloading tasks of an unmanned aerial vehicle (UAV) based on an edge computing scenario are provided. An offloading task model, an offloading task decision model, an offloading task delay calculation model in different offloading scenarios and an offloading task user satisfaction model based on a prospect theory are constructed. Based on the constructed models, an optimization function and a constraint condition are constructed, and an optimal offloading decision, an optimal caching decision and an optimal resource allocation decision are obtained by solving the optimization function. When the UAV receives a task offloading request from an offloading user, whether input data of an offloading task corresponding to the task offloading request has been cached in the UAV is considered, so as to determine whether it is necessary to upload the input data of the offloading task.

7 Claims, 2 Drawing Sheets

(56) References Cited

U.S. PATENT DOCUMENTS

2024/0119845 A1* 4/2024 Huda ...................... G08G 5/30
2024/0281286 A1* 8/2024 Acharya Chandrashekar ............
                                                        G06F 9/5027

OTHER PUBLICATIONS

CNIPA, Notification of a First Office Action for CN202410174286.9, Jan. 29, 2025.
Guangdong university of technology (Applicant), Replacement claims (allowed) of CN202410174286.9, Feb. 20, 2025.
CNIPA, Notification to grant patent right for invention in CN202410174286.9, Mar. 11, 2025.

* cited by examiner

METHOD AND SYSTEM FOR PROCESSING OFFLOADING TASKS OF UNMANNED AERIAL VEHICLE BASED ON EDGE COMPUTING SCENARIO

CROSS-REFERENCE TO RELATED APPLICATION

This application claims priority to Chinese patent application No. CN 202410174286.9, filed to China National Intellectual Property Administration (CNIPA) on Feb. 7, 2024, which is herein incorporated by reference in its entirety.

TECHNICAL FIELD

The present disclosure relates to the technical field of edge computing, and particularly to a method and a system for processing offloading tasks of an unmanned aerial vehicle (UAV) based on an edge computing scenario.

BACKGROUND

With the rapid development of mobile Internet, the widespread popularity of mobile devices and the emergence of various new computing-intensive applications, data traffic is experiencing explosive growth. When new computing-intensive and delay-sensitive applications such as autonomous driving applications, augmented reality applications and virtual reality applications are run, a large number of computing tasks will be generated. However, the mobile devices are limited by the energy of their batteries and the computing power of central processing units (CPUs) of the mobile devices, so it is difficult to complete the processing before corresponding task deadlines.

Mobile edge computing (MEC) is a solution to solve the above challenges. This technology sinks a cloud computing capability to a network edge close to mobile devices of users, and provides the mobile devices of the users with computing services by deploying servers in base stations/vehicles/UAVs close to the mobile devices of the users to reduce time delay and energy consumption of the mobile devices of the users in processing tasks. An offloading process of edge computing includes three parts: uploading of input data, processing of computing tasks by an edge server, and return of computing results. Because a size of the computing results in an actual scene is too small compared with sizes of the first two, the computing results are often ignored in a modeling process.

Compared with a traditional edge computing network architecture, a UAV-assisted MEC network has the advantages of flexible deployment, stronger mobility, and line-of-sight communication, and is more suitable for deployment in emergency rescue, maritime communication, emergency communication and other scenarios. However, compared with fixed ground base stations, UAVs have limited energy and cannot provide computing services permanently. When an offloading request from a user arrives, a remaining power for calculation of a UAV is not enough to support the calculation completion of task. In this case, it is very likely that "offloading failure" will occur. From a point of view of a user, the UAV-assisted edge computing network has the risk of uncertain offloading failure, and a subjective offloading willingness of the user is often affected by the risk of offloading failure. However, the existing technology often ignores this scene of offloading failure and the impact of offloading failure risk on the subjective offloading willingness of the user.

SUMMARY

The present disclosure provides a method and a system for processing offloading tasks of a UAV based on an edge computing scenario, which are used for solving the technical problems that an edge computing task of the UAV does not consider a limited energy of the UAV, an offloading task may not be processed, and a subjective offloading willingness of a user is ignored under the risk of download failure.

In view of this, in one aspect, an embodiment of the present disclosure provides a method for processing offloading tasks of a UAV based on an edge computing scenario, which includes:

obtaining, by a software-defined networking (SDN) controller carried by the UAV, information of mobile users in a coverage area of the UAV;

constructing an offloading task model, an offloading task decision model, an offloading task delay calculation model in different offloading scenarios and an offloading task user satisfaction model based on a prospect theory, by the SDN controller according to the information of the mobile users, the offloading task decision model includes offloading decisions, caching decisions and resource allocation decisions, and the offloading decisions include UAV offloading with an enough energy to support the offloading task execution and local offloading with an insufficient energy to support offloading task execution;

constructing an optimization function based on the offloading decisions, the caching decisions and the resource allocation decisions and a constraint condition of the optimization function, by the SDN controller based on the offloading task model, the offloading task decision model, the offloading task delay calculation model in the different offloading scenarios and the offloading task user satisfaction model based on the prospect theory;

solving, by the SDN controller, the optimization function to obtain an optimal offloading decision, an optimal caching decision and an optimal resource allocation decision, sending, by the SDN controller, the optimal caching decision and the optimal resource allocation decision to the UAV, and sending, by the SDN controller, the optimal offloading decision to an offloading user, the optimal caching decision includes caching input data of the offloading tasks and not caching input data of the offloading tasks;

in response to the UAV having received a task offloading request from the offloading user, inquiring, by the UAV, whether the input data of the offloading task corresponding to the task offloading request has been cached in the UAV; in response to the input data of the offloading task corresponding to the task offloading request having been cached in the UAV, informing, by the UAV, the offloading user that it is unnecessary to upload the input data of the offloading task to the UAV, and processing, by an edge server mounted on the UAV, the offloading task according to the optimal resource allocation decision; in response to the input data of the offloading task corresponding to the task offloading request having not been cached in the UAV, informing, by the UAV, the offloading user to upload the input data of the offloading task to the UAV, and processing, by the edge server, the offloading task according to the optimal resource allocation decision, the offloading user is a mobile user who initiates the task offloading request within the coverage area of the UAV; and transmitting, by the UAV, a calculation result of the offloading task to the offloading user.

In an embodiment, the offloading task model is expressed as follows:

$$T_i = \{d_i, w_i, \tau_i\}$$

where $T_i$ represents an i-th offloading task of the offloading tasks; $d_i$ represents a data size of the i-th offloading task; $w_i$ represents a complexity of the i-th offloading task; and $\tau_i$ represents a maximum tolerable deadline for the i-th offloading task;

the offloading task decision model is expressed as follows:

$$O = \{o_1, o_2, \ldots, o_i, \ldots, o_n\}$$
$$X = \{x_1, x_2, \ldots, x_i, \ldots, x_n\}$$
$$F = \{f_1^F, f_2^F, \ldots, f_i^F, \ldots, f_n^F\}$$

where O represents an offloading decision set of the offloading tasks; $o_i$ represents an offloading decision of the i-th offloading task; n represents a total number of the offloading tasks; X represents a caching decision set of the offloading tasks; $x_i$ represents a caching decision of the i-th offloading task; F represents a resource allocation decision set of the offloading tasks; and $f_i^F$ represents a resource allocation decision allocated by the UAV to the i-th offloading task;

the offloading task delay calculation model in different offloading scenarios includes an offloading task delay calculation model in a local offloading scenario and an offloading task delay calculation model in an edge offloading scenario, and the offloading task delay calculation model in the local offloading scenario is expressed as follows:

$$T_i^L = \frac{w_i}{f_i^L}$$

where $T_i^L$ represents a computing delay of the i-th offloading task in the local offloading scenario, and $f_i^L$ represents a computing resource of a mobile user corresponding to the i-th offloading task;

the offloading task delay calculation model in the edge offloading scenario is expressed as follows:

$$T_i^{fsucc} = (1-x_i)T_i^{trans} + T_i^{comp}$$
$$T_i^{ffail} = (1-x_i)T_i^{trans} + T_i^L$$

where $T_i^{fsucc}$ represents a calculation delay when the i-th offloading task is successfully offloaded; $T_i^{ffail}$ represents a calculation delay when the i-th offloading task fails to offload; $T_i^{trans}$ represents a transmission time for uploading the i-th offloading task to the UAV; and $T_i^{comp}$ represents a calculation time of the i-th offloading task on the edge server;

the offloading task user satisfaction model based on the prospect theory is expressed as follows:

$$S_i = o_i E_i^{off} - (1-o_i)T_i^L$$

$$E_i^{off} = \begin{cases} (\Delta x_i^{succ}), & p_{succ} \\ -\lambda(\Delta x_i^{fail})^\alpha, & p_{fail} \end{cases}$$

$$\Delta x_i^{succ} = T_i^L - T_i^{fsucc}$$

$$\Delta x_i^{fail} = T_i^{ffail} - T_i^L$$

$$p_{fail} = \begin{cases} \dfrac{\sum_i o_i}{N_{max}}, & \sum_i o_i < N_{max} \\ 1, & \sum_i o_i \geq N_{max} \end{cases}$$

where $S_i$ represents a user satisfaction for the i-th offloading task; $E_i^{off}$ represents a user prospect value function for offloading the i-th offloading task based on the prospect theory; $\Delta x_i^{succ}$ represents a user relative profit function when the i-th offloading task is offloaded successfully; $\Delta x_i^{fail}$ represents a user relative loss function when the i-th offloading task fails to offload; $\alpha$ represents a risk-sensitive factor; $\lambda$ represents a degree of aversion to loss; $p_{fail}$ represents a user perceived probability of offloading failure through a number of offloading decisions that the UAV has received; $p_{succ}$ represents a user perceived probability of successful offloading obtained through the number of offloading decisions that the UAV has received; $\Sigma_i o_i$ represents a total number of offloading tasks offloaded to the UAV; and $N_{max}$ represents a threshold of offloading failure.

In an embodiment, the optimization function based on the offloading decisions, the caching decisions and the resource allocation decisions is expressed as follows:

$$\max_{O,X,F} \sum_i S_i;$$

and the constraint condition of the optimization function is expressed as follows:

$$o_i, x_i \in \{0, 1\}, \forall i \in n$$
$$\sum_i d_i x_i \leq C_f^{max}, \forall i \in n$$
$$\sum_i o_i f_i^F \leq F_f^{max}, \forall i \in n$$
$$o_i \|P_f - P_i\| \leq R_f^{max}, \forall i \in n$$
$$T_i^{fsucc} \leq T_i^L, \forall i \in n$$

where $C_f^{max}$ represents a maximum storage capacity of the edge server carried by the UAV; $F_f^{max}$ represents a maximum computing capacity of the edge server carried by the UAV; $f_i^F$ represents a computing resource allocated by the UAV to the i-th offloading task; $P_f$ represents a position of the UAV; $P_i$ represents a position of an offloading user; $\|P_f - P_i\|$ represents a distance between the UAV and the offloading user; and $R_f^{max}$ represents a maximum coverage of the UAV.

In an embodiment, the solving, by the SDN controller, the optimization function includes:

decoupling, by the SDN controller, the optimization function into an objective function of an offloading decision sub-problem, an objective function of a caching decision sub-problem and an objective function of a resource allocation decision sub-problem by using a block coordinate descent method; and solving the objective function of the offloading decision sub-problem, the objective function of the caching decision sub-problem and the objective function of the resource allocation decision sub-problem.

In an embodiment, the solving the objective function of the offloading decision sub-problem, the objective function of the caching decision sub-problem and the objective function of the resource allocation decision sub-problem includes:

solving the objective function of the offloading decision sub-problem by using a genetic algorithm;

solving the objective function of the caching decision sub-problem by using a dynamic programming algorithm; and solving the objective function of the resource allocation decision sub-problem by using a convex optimization (CVX) solver.

In another aspect, an embodiment of the present disclosure provides a system for processing offloading tasks of a UAV based on an edge computing scenario. The system includes the UAV, an SDN controller, and an edge server. The UAV is equipped with the SDN controller and the edge server. the SDN controller is configured to: obtain information of mobile users in a coverage area of the UAV; construct an offloading task model, an offloading task decision model, an offloading task delay calculation model in different offloading scenarios and an offloading task user satisfaction model based on a prospect theory according to the information of the mobile users, the offloading task decision model includes offloading decisions, caching decisions and resource allocation decisions, and the offloading decisions include UAV offloading with an enough energy to support the offloading task execution and local offloading with an insufficient energy to support offloading task execution; construct an optimization function based on the offloading decisions, the caching decisions and the resource allocation decisions and a constraint condition of the optimization function according to the offloading task model, the offloading task decision model, the offloading task delay calculation model in different offloading scenarios and the offloading task user satisfaction model based on the prospect theory; and solve the optimization function to obtain an optimal offloading decision, an optimal caching decision and an optimal resource allocation decision, send the optimal caching decision and the optimal resource allocation decision to the UAV, and send the optimal offloading decision to an offloading user, the optimal caching decision includes caching input data of the offloading tasks and not caching input data of the offloading tasks. The UAV is configured to: in response to the UAV having received a task offloading request from the offloading user, inquire whether the input data of the offloading task corresponding to the task offloading request has been cached in the UAV; in response to the input data of the offloading task corresponding to the task offloading request having been cached in the UAV, inform the offloading user that it is unnecessary to upload the input data of the offloading task to the UAV, and process, the offloading task according to the optimal resource allocation decision through the edge server mounted on the UAV; in response to the input data of the offloading task corresponding to the task offloading request having not been cached in the UAV, inform the offloading user to upload the input data of the offloading task to the UAV, and process the offloading task according to the optimal resource allocation decision through the edge server, the offloading user is a mobile user who initiates the task offloading request within the coverage area of the UAV; and transmit a calculation result of the offloading task to the offloading user.

In an embodiment, the offloading task model is expressed as follows:

$$T_i = \{d_i, w_i, \tau_i\}$$

where $T_i$ represents an i-th offloading task of the offloading tasks; $d_i$ represents a data size of the i-th offloading task; $w_i$ represents a complexity of the i-th offloading task; and $\tau_i$ represents a maximum tolerable deadline for the i-th offloading task;

the offloading task decision model is expressed as follows:

$$O = \{o_1, o_2, \ldots, o_i, \ldots, o_n\}$$
$$X = \{x_1, x_2, \ldots, x_i, \ldots, x_n\}$$
$$F = \{f_1^F, f_2^F, \ldots, f_i^F, \ldots, f_n^F\}$$

where O represents an offloading decision set of the offloading tasks; $o_i$ represents an offloading decision of the i-th offloading task; n represents a total number of the offloading tasks; X represents a caching decision set of the offloading tasks; $x_i$ represents a caching decision of the i-th offloading task; F represents a resource allocation decision set of the offloading tasks; and $f_i^F$ represents a resource allocation decision allocated by the UAV to the i-th offloading task;

the offloading task delay calculation model in different offloading scenarios includes an offloading task delay calculation model in a local offloading scenario and an offloading task delay calculation model in an edge offloading scenario, and the offloading task delay calculation model in the local offloading scenario is expressed as follows:

$$T_i^L = \frac{w_i}{f_i^L}$$

where $T_i^L$ represents a computing delay of the i-th offloading task in the local offloading scenario, and $f_i^L$ represents a computing resource of a mobile user corresponding to the i-th offloading task;

the offloading task delay calculation model in the edge offloading scenario is expressed as follows:

$$T_i^{fsucc} = (1 - x_i)T_i^{trans} + T_i^{comp}$$

$$T_i^{ffail} = (1 - x_i)T_i^{trans} + T_i^L$$

where $T_i^{fsucc}$ represents a calculation delay when the i-th offloading task is successfully offloaded; $T_i$ fail represents a calculation delay when the i-th offloading task fails to offload; $T_i^{trans}$ represents a transmission time for uploading the i-th offloading task to the UAV; and $T_i^{comp}$ represents a calculation time of the i-th offloading task on the edge server;

the offloading task user satisfaction model based on the prospect theory is expressed as follows:

$$S_i = o_i E_i^{off} - (1 - o_i)T_i^L$$

$$E_i^{off} = \begin{cases} (\Delta x_i^{succ}), & p_{succ} \\ -\lambda(\Delta x_i^{fail})^\alpha, & p_{fail} \end{cases}$$

$$\Delta x_i^{succ} = T_i^L - T_i^{fsucc}$$

$$\Delta x_i^{fail} = T_i^{ffail} - T_i^L$$

$$p_{fail} = \begin{cases} \dfrac{\sum_i o_i}{N_{max}}, & \sum_i o_i < N_{max} \\ 1, & \sum_i o_i \geq N_{max} \end{cases}$$

where $S_i$ represents a user satisfaction for the i-th offloading task; $E_i^{off}$ represents a user prospect value function for offloading the i-th offloading task based on the prospect theory; $\Delta x_i^{succ}$ represents a user relative profit function when the i-th offloading task is offloaded successfully; $\Delta x_i^{fail}$ represents a user relative loss function when the i-th offloading task fails to offload; $\alpha$ represents a risk-sensitive factor; $\lambda$ represents a degree of aversion to loss; $p_{fail}$ represents a user perceived probability of offloading failure through a number of offloading decisions that the UAV has received; $p_{succ}$ represents a user perceived probability of successful offloading obtained through the number of offloading decisions that the UAV has received; $\Sigma_i o_i$ represents a total number of offloading tasks offloaded to the UAV; and $N_{max}$ represents a threshold of offloading failure.

In an embodiment, the optimization function based on the offloading decisions, the caching decisions and the resource allocation decisions is expressed as follows:

$$\max_{O,X,F} \sum_i S_i;$$

and
the constraint condition of the optimization function is expressed as follows:

$$o_i, x_i \in \{0, 1\}, \forall i \in n$$

$$\sum_i d_i x_i \leq C_f^{max}, \forall i \in n$$

$$\sum_i o_i f_i^F \leq F_f^{max}, \forall i \in n$$

$$o_i \|P_f - P_i\| \leq R_f^{max}, \forall i \in n$$

$$T_i^{fsucc} \leq T_i^L, \forall i \in n$$

where $C_f^{max}$ represents a maximum storage capacity of the edge server carried by the UAV; $F_f^{max}$ represents a maximum computing capacity of the edge server carried by the UAV; $f_i^F$ represents a computing resource allocated by the UAV to the i-th offloading task; $P_f$ represents a position of the UAV; $P_i$ represents a position of an offloading user; $\|P_f-P_i\|$ represents a distance between the UAV and the offloading user; and $R_f^{max}$ represents a maximum coverage of the UAV.

In an embodiment, a process for solving the optimization function includes:
decoupling, by the SDN controller, the optimization function into an objective function of an offloading decision sub-problem, an objective function of a caching decision sub-problem and an objective function of a resource allocation decision sub-problem by using a block coordinate descent method; and
solving the objective function of the offloading decision sub-problem, the objective function of the caching decision sub-problem and the objective function of the resource allocation decision sub-problem.

In an embodiment, the objective function of the offloading decision sub-problem is solved by using a genetic algorithm, the objective function of the caching decision sub-problem is solved by using a dynamic programming algorithm, and the objective function of the resource allocation decision sub-problem is solved by using a CVX solver.

As can be seen from the above technical solutions, the method for processing offloading tasks of the UAV based on the edge computing scenario provided by the present disclosure has at least the following advantages.

The method for processing offloading tasks of the UAV based on the edge computing scenario provided by the present disclosure considers the problems that the UAV has limited energy and risks of offloading failure, and constructs an offloading task model, an offloading task decision model, an offloading task delay calculation model under different offloading scenarios and an offloading task user satisfaction model based on a prospect theory. Specifically, the offloading task decision model includes offloading decision, caching decision and resource allocation decision. The offloading decision includes UAV offloading with enough energy to support offloading task execution and local offloading with insufficient energy to support offloading task execution. Based on the constructed models, an optimization function and a constraint condition for the optimization function are constructed, and optimal offloading decision, optimal caching decision and optimal resource allocation decision are obtained by solving the optimization function. When the UAV receives a task offloading request from an offloading user, it is queried whether input data of an offloading task corresponding to the task offloading request is cached in the UAV. When the input data of the offloading task corresponding to the task offloading request is cached in the UAV, the offloading user is not required to be informed to upload the input data of the offloading task, and the offloading task is directly processed according to the optimal resource allocation decision. When the input data of the offloading task corresponding to the task offloading request is not cached in the UAV, the offloading user is informed to upload the input data of the offloading task, and the offloading task is processed according to the optimal resource allocation decision. The method of the present disclosure solves the technical problems that an edge computing task of the UAV does not consider a limited energy of the UAV, an offloading task may not be processed, and a subjective offloading willingness of a user is ignored under the risk of download failure.

BRIEF DESCRIPTION OF DRAWINGS

In order to explain the embodiments of the present disclosure or technical solutions in the related art more clearly, accompanying drawings needed in the description of the embodiments or the related art will be briefly introduced below. Apparently, the accompanying drawings in the following description are merely some embodiments of the present disclosure, and other related drawings can be obtained by the skilled in the art without creative work.

DETAILED DESCRIPTION OF EMBODIMENTS

In order to make the skilled in the art better understand the technical solutions of the present disclosure, the technical solutions in the embodiments of the present disclosure will be described clearly and completely with reference to the accompanying drawings. Apparently, the described embodiments are only part of embodiments of the present disclosure, but not the whole embodiment. Based on the described embodiments in the present disclosure, all other embodiments obtained by the skilled in the art without creative labor belong to the scope of protection of the present disclosure.

Figure 1:
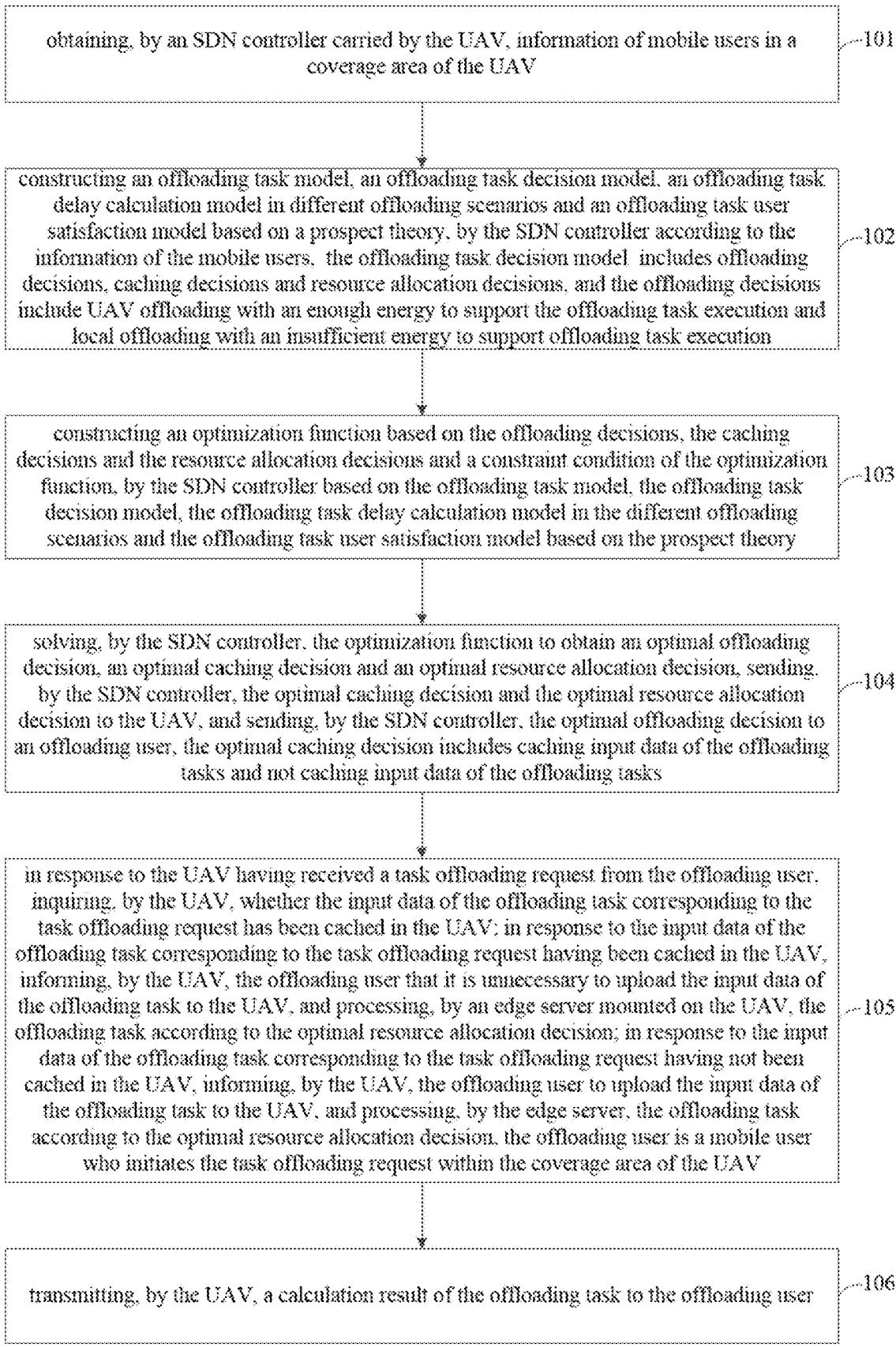
FIG. 1 illustrates a schematic flow diagram of a method for processing offloading tasks of a UAV based on an edge computing scenario according to an embodiment of the present disclosure.

In order to facilitate understanding, please refer to FIG. 1, an embodiment of the present disclosure provides a method for processing offloading tasks of a UAV based on an edge computing scenario, which includes steps 101-106.

In step 101, information of mobile users in a coverage area of the UAV is obtained by a software-defined networking (SDN) controller carried by the UAV.

It should be noted that the UAV is equipped with an edge server and a cache device, which can provide a computing offloading service and a data caching service for the n mobile users in the coverage area of the UAV, where n is an integer. The SDN controller is configured to perform centralized control by separating a control layer from a data layer. The data layer is configured to collect network statuses of the UAV and the mobile users in real time, which include a size and complexity of a task of each of the mobile users, as well as a cache capacity and a computing capability of the UAV. The control layer is configured to solve an optimal decision through an algorithm, and feed the optimal decision back to the UAV and the mobile users to realize task offloading scheduling of a corresponding system and the allocation of cache space and computing resources of the UAV. It should be noted that the mobile users herein are mobile devices such as, mobile phones, portable computers, or tablets.

In step 102, an offloading task model, an offloading task decision model, an offloading task delay calculation model in different offloading scenarios and an offloading task user satisfaction model based on a prospect theory are constructed according to the information of the mobile users, where the offloading task decision model includes offloading decisions, caching decisions and resource allocation decisions, and the offloading decisions include UAV offloading with an enough energy to support offloading task execution and local offloading with an insufficient energy to support offloading task execution.

It should be noted that a set of the mobile users within the coverage area of the UAV is defined as {1, 2, ..., n}. Each mobile user has a computing task, which is computation-intensive and delay-sensitive, and the offloading task model is defined as:

$$T_i = \{d_i, w_i, \tau_i\}$$

where $T_i$ represents an i-th offloading task of the offloading tasks; $d_i$ represents a data size of the i-th offloading task, which is usually related to a nature of the i-th offloading task; $w_i$ represents a complexity of the i-th offloading task, that is, a computing resource needed to process the i-th offloading task, that is, a total number of a clock cycle of a CPU; and $\tau_i$ represents a maximum tolerable deadline for the i-th offloading task. If an actual time exceeds the maximum tolerable deadline, it means that a processing manner of the i-th offloading task does not meet a real-time requirement of the i-th offloading task.

The offloading task decision model is defined as:

$$O = \{o_1, o_2, \ldots, o_i, \ldots, o_n\}$$
$$X = \{x_1, x_2, \ldots, x_i, \ldots, x_n\}$$
$$F = \{f_1^F, f_2^F, \ldots, f_i^F, \ldots, f_n^F\}$$

where O represents an offloading decision set of the offloading tasks; $o_i$ represents an offloading decision of the i-th offloading task; n represents a total number of the offloading tasks; X represents a caching decision set of the offloading tasks; $x_i$ represents a caching decision of the i-th offloading task; F represents a resource allocation decision set of the offloading tasks; and $f_i^F$ represents a resource allocation decision (also referred to as a resource allocation decision) allocated by the UAV to the i-th offloading task.

When $o_i$ is 1, it means that an energy of the UAV is enough to complete the i-th offloading task, and the i-th offloading task is offloaded to the UAV. When $o_i$ is 0, it means that the energy of the UAV may not be enough to complete the i-th offloading task, and there is a risk of task offloading failure, so the i-th offloading task is calculated locally by a corresponding mobile user.

When $x_i$ is 1, it means that the UAV caches input data of the i-th offloading task. When $x_i$ is 0, it means that the input data of the i-th offloading task is not cached.

In an embodiment, the offloading task delay calculation model in different offloading scenarios includes an offloading task delay calculation model in a local offloading scenario and an offloading task delay calculation model in an edge offloading scenario. The offloading task delay calculation model in the local offloading scenario is expressed as follows:

$$T_i^L = \frac{w_i}{f_i^L}$$

where $T_i^L$ represents a computing delay of the i-th offloading task in the local offloading scenario, and $f_i^L$ represents a computing resource of a mobile user corresponding to the i-th offloading task.

The offloading task delay calculation model in the edge offloading scenario is obtained through the following manner.

By an orthogonal frequency division multiple access (OFDMA) technology, the mobile users are separated in a frequency domain with an equal bandwidth, which avoids communication interference between the mobile users and ignores the mobility of the mobile users. By default, a channel gain $h_{if}$ of a mobile user i relative to the UAV is a constant. Therefore, an upload speed $R_i$ of the mobile user i is expressed as follows:

$$R_i = W\log_2\left(1 + \frac{p_i h_{if}}{\sigma_0^2}\right)$$

where W represents a channel bandwidth, $p_i$ represents a transmission power of the mobile user i, $h_{if}$ represents the channel gain, and $\sigma_0$ represents a Gaussian white noise in a space.

A transmission time of the i-th offloading task uploaded to the UAV is expressed as follows:

$$T_i^{trans} = \frac{d_i}{R_i}$$

where $T_i^{trans}$ represents the transmission time for uploading the i-th offloading task to the UAV.

A calculation time of the i-th offloading task on the edge server is expressed as follows:

$$T_i^{comp} = \frac{w_i}{f_i^F}$$

where $T_i^{comp}$ represents the calculation time of the i-th offloading task on the edge server.

When the input data of the i-th offloading task has been cached in the edge server, the edge server can directly use the cached input data for calculation, and the corresponding mobile user do not need to upload the input data to the UAV. Therefore, when the i-th offloading task is offloaded successfully by the corresponding mobile user, a processing delay of the i-th offloading task is expressed as follows:

$$T_i^{fsucc} = (1 - x_i)T_i^{trans} + T_i^{comp}$$

where $T_i^{fsucc}$ represents a calculation delay (i.e., the processing delay) when the i-th offloading task is offloaded successfully.

Due to the limited energy of the UAV, after the mobile user uploads the input data to the UAV, the remaining power of the UAV can't handle the corresponding offloading task, and the mobile user has to perform local calculation again. When the i-th offloading task fails to offload to the UAV, a processing delay of the i-th offloading task is expressed as follows:

$$T_i^{ffail} = (1 - x_i)T_i^{trans} + T_i^L$$

where $T_i^{ffail}$ represents a calculation delay (i.e., the processing delay) when the i-th offloading task fails to offload.

The mobile user can't be sure whether the offloading task will be offloaded successfully or not before the mobile user makes a corresponding offloading decision. With the help of the tragedy of the commons, a user perceived probability of offloading failure obtained through a number of offloading decisions that the UAV has received is expressed as follows:

$$p_{fail} = \begin{cases} \frac{\sum_i o_i}{N_{max}}, & \sum_i o_i < N_{max} \\ 1, & \sum_i o_i \geq N_{max} \end{cases}$$

where $p_{fail}$ represents the user perceived probability of offloading failure obtained through the number of offloading decisions that the UAV has received; $\Sigma_i o_i$ represents a total number of offloading tasks offloaded to the UAV; and $N_{max}$ represents a threshold of offloading failure, when the total number of the offloading tasks offloaded to the UAV exceeds the threshold of offloading failure, it is determined by the mobile user that a corresponding offloading task fails to offload.

In this uncertain environment, the mobile user faces the risk that the performance of task processing due to the failure of offloading is worse than that of local processing. In this risk environment, users' decisions are often influenced by users' subjective preferences. In the present disclosure, the prospect theory is introduced to describe the influence of user's subjective preference on the offloading decision. The prospect theory is one of the four research achievements of behavioral economics, which applies psychological research to the field of economics and provides theoretical guidance for human decision-making under uncertain circumstances. Compared with paying attention to the change of value, the prospect theory pays more attention to people's perception of profit and loss relative to the reference point. A value function of the prospect theory is expressed as follows:

$$E = \begin{cases} (x - x_0)^\alpha, & x \geq x_0 \\ -\lambda(x_0 - x), & x < x_0 \end{cases}$$

where when $x \geq x_0$, $x - x_0$ represents that a decision-maker gains relative to a reference point; when $x < x_0$, $x_0 - x$ represents that the decision-maker loses interest relative to the reference point. $\alpha$ represents a risk-sensitive factor of the decision maker, and usually takes a constant between [0, 1]. $\lambda$ represents a degree of aversion to loss. In the real world, most people will avoid risk (a concave function) when they are in a profitable state. In the state of loss, the people are more willing to choose an option with greater risk (a convex function). People hate the pain of loss more than the joy of gain ($\lambda > 1$).

By default, successful offloading can provide better performance to the UAV, while the performance of the UAV in case of failed offloading is worse than that of local calculation. Therefore, the time delay of the local calculation is taken as the reference point, the performance saved by successful task offloading compared with the local calculation is regarded as "profit", and the performance lost by failed offloading compared with local calculation is regarded as loss. Define the time delay of the local calculation as the reference point, and a user relative profit function and a user relative loss function are expressed as follows:

$$\Delta x_i^{succ} = T_i^L - T_i^{fsucc}$$
$$\Delta x_i^{fail} = T_i^{ffail} - T_i^L$$

where $\Delta x_i^{succ}$ represents the user relative profit function when the i-th offloading task is successfully offloaded, and $\Delta x_i^{fail}$ represents the user relative loss function when the i-th offloading task fails to offload.

Therefore, a user prospect value function $E_i^{off}$ for offloading the i-th offloading task based on the prospect theory is expressed as follows:

$$E_i^{off} = \begin{cases} (\Delta x_i^{succ}), & p_{succ} \\ -\lambda(\Delta x_i^{fail})^\alpha, & p_{fail} \end{cases}$$

where $p_{succ} = 1 - p_{fail}$, and $p_{succ}$ represents a user perceived probability of successful offloading obtained through the number of offloading decisions that the UAV has received.

Combining the local calculation delay (i.e., the computing delay of the i-th offloading task in the local offloading scenario) $T_i^L$ and the user prospect value function $E_i^{off}$ for offloading the i-th offloading task based on the prospect theory, a user satisfaction is defined as follows:

$$S_i = o_i E_i^{off} - (1 - o_i) T_i^L$$

where $S_i$ represents the user satisfaction for the i-th offloading task.

In step 103, an optimization function based on the offloading decisions, the caching decisions and the resource allocation decisions and a constraint condition of the optimization function are constructed by the SDN controller based on the offloading task model, the offloading task decision model, the offloading task delay calculation model in different offloading scenarios and the offloading task user satisfaction model based on the prospect theory.

It should be noted that the optimization function based on the offloading decisions, the caching decisions and the resource allocation decisions is expressed as follows:

$$\max_{O,X,F} \sum_i S_i;$$

and the constraint condition of the optimization function is expressed as follows:

$$o_i, x_i \in \{0, 1\}, \forall i \in n$$
$$\sum_i d_i x_i \leq C_f^{max}, \forall i \in n$$
$$\sum_i o_i f_i^F \leq F_f^{max}, \forall i \in n$$
$$o_i \|P_f - P_i\| \leq R_f^{max}, \forall i \in n$$
$$T_i^{fsucc} \leq T_i^L, \forall i \in n$$

where $C_f^{max}$ represents a maximum storage capacity of the edge server carried by the UAV; $F_f^{max}$ represents a maximum computing capacity of the edge server carried by the UAV; $f_i^F$ represents a computing resource allocated by the UAV to the i-th offloading task; $P_f$ represents a position of the UAV; $P_i$ represents a position of an offloading user; $\|P_f - P_i\|$ represents a distance between the UAV and the offloading user; and $R_f^{max}$ represents a maximum coverage of the UAV.

In step 104, the optimization function is solved by the SDN controller to obtain an optimal offloading decision, an optimal caching decision and an optimal resource allocation decision, the optimal caching decision and the optimal resource allocation decision are sent by the SDN controller to the UAV, and the optimal offloading decision is sent by the SDN controller to the offloading user, the optimal caching decision includes caching input data of the offloading tasks and not caching input data of the offloading tasks.

It should be noted that this problem is a 0-1 mixed integer nonlinear programming problem which is difficult to solve directly because a corresponding objective function is a nonconvex function, the variables to be solved $o_i$ and $x_i$ are binary variables, a resource allocation decision $f_i^F$ is a continuous variable, and the above variables are coupled with each other. In order to solve this problem conveniently, based on the idea of a block coordinate descent method, the problem is decoupled into an offloading decision sub-problem $P_1$ a caching decision sub-problem $P_2$ and a resource allocation sub-problem $P_3$, and the three sub-problems are solved by different methods respectively.

With respect to the offloading decision sub-problem $P_1$, the following technical solution is adopted.

A preset cache decision is expressed as $\check{X}$ and a preset resource allocation decision is expressed as $\check{F}$, and the optimal offloading decision O is obtained by solving the offloading decision sub-problem $P_1$. Therefore, the offloading decision sub-problem $P_1$ is expressed as follows:

$$\max_{O,X,F} \sum_i S_i$$
$$o_i, x_i \in \{0, 1\}, \forall i \in n$$
$$\sum_i o_i f_i^F \leq F_f^{max}, \forall i \in n$$
$$o_i \|P_f - P_i\| \leq R_f^{max}, \forall i \in n.$$

Because the offloading decision sub-problem $P_1$ is a 0-1 integer nonlinear programming problem, the optimization objective, i.e., the optimal offloading decision O, is still a non-convex function, and an intelligent optimization algorithm does not require the objective function to be continuous, differentiable and derivable, so it is suitable for solving nonlinear and non-smooth problems. Therefore, a genetic algorithm can be used to solve the problem.

With respect to the caching decision sub-problem $P_2$, the following technical solution is adopted.

A preset offloading decision is expressed as $\grave{O}$ a preset resource allocation decision is expressed as $\grave{F}$, and the optimal cache decision X is obtained by solving the caching decision sub-problem $P_2$.

The caching decision sub-problem $P_2$ is expressed as follows:

$$\max_{\grave{O}, X, \grave{F}} \sum_i S_i$$

$$\sum_i d_i x_i \leq C_f^{max}, \forall i \in n$$

$$T_i^{fsucc} \leq T_i^L, \forall i \in n$$

The caching decision sub-problem $P_2$ can be regarded as a 0-1 knapsack problem. A limited cache capacity $C_f^{max}$ is regarded as a capacity of a backpack, a size $d_i$ of the input data of the i-th offloading task is a weight of an object, and a user subjective utility $S_i$ represents a loading value of the object. Therefore, a dynamic programming algorithm commonly used to solve knapsack problem is used to solve the caching decision sub-problem $P_2$.

With respect to the resource allocation sub-problem $P_3$, the following technical solution is adopted.

A preset offloading decision is expressed as $\grave{O}$, a preset caching decision is expressed as $\grave{X}$, and the resource allocation sub-problem $P_3$ is solved to obtain the optimal resource allocation decision F. The resource allocation sub-problem $P_3$ is expressed as follows:

$$\max_{\grave{O}, \grave{X}, F} \sum_i S_i$$

$$\sum_i o_i f_i^F \leq F_f^{max}, \forall i \in n$$

$$T_i^{fsucc} \leq T_i^L, \forall i \in n$$

After the offloading decision and the caching decision are preset, the optimization objective $S_i$ is a convex function. However, the constraints $\Sigma_i o_i f_i^F \leq F_f^{max}$, $\forall i \in n$ and $T_i^{fsucc} \leq T_i^L$, $\forall i \in n$ are linear constraints, so the resource allocation sub-problem $P_3$ is a convex problem, and the optimal resource allocation decision F can be obtained directly by using a convex optimization (CVX) solver.

After solving the optimal offloading decision, optimal caching decision and optimal resource allocation decision, the optimal caching decision and the optimal resource allocation decision are sent to the UAV, and the optimal offloading decision is sent to the offloading user. The offloading user is a mobile user who initiates a task offloading request within the coverage of the UAV. The offloading user can decide whether to offload a task to the UAV or local processing according to the optimal offloading decision.

In step 105, in response to the UAV having received a task offloading request from the offloading user, whether the input data of the offloading task corresponding to the task offloading request has been cached in the UAV that is inquired by the UAV; in response to the input data of the offloading task corresponding to the task offloading request having been cached in the UAV, the offloading user is informed by the UAV that it is unnecessary to upload the input data of the offloading task to the UAV, and the offloading task is processed by the edge server mounted on the UAV according to the optimal resource allocation decision; in response to the input data of the offloading task corresponding to the task offloading request having been not cached in the UAV, the offloading user is informed by the UAV to upload the input data of the offloading task to the UAV, and the offloading task is processed by the edge server according to the optimal resource allocation decision, where the offloading user is a mobile user who initiates the task offloading request within the coverage area of the UAV.

It should be noted that when the offloading user decides to offload the task to the UAV for processing, the task offloading request is sent to the UAV. When the UAV receives the task offloading request of the offloading user, it inquires whether the input data of the offloading task corresponding to the task offloading request is cached in the UAV, and if so, it informs the offloading user that it is unnecessary to upload the input data of the offloading task to the UAV, and the UAV directly uses the cached input data for task offloading processing, and directly processes the offloading task according to the optimal resource allocation decision through the edge server to obtain a calculation result of the offloading task. If the input data of the offloading task corresponding to the task offloading request is not cached in the UAV, the offloading user is informed to upload the input data of the offloading task to the UAV, and the edge server carried by the UAV processes the offloading task according to the optimal resource allocation decision to obtain a calculation result of the offloading task. Compared with ordinary edge calculation, the present disclosure considers the auxiliary offloading of cache, which can reduce the upload delay of the input data.

In step 106, the calculation result of the offloading task is transmitted by the UAV to the offloading user.

It should be noted that when the edge server carried by the UAV completes the offloading task, the calculation result is sent to the offloading user.

The method for processing offloading tasks of the UAV based on the edge computing scenario provided by the present disclosure considers the problems that the UAV has limited energy and risks of offloading failure, and constructs an offloading task model, an offloading task decision model, an offloading task delay calculation model under different offloading scenarios and an offloading task user satisfaction model based on a prospect theory. Specifically, the offloading task decision model includes offloading decision, caching decision and resource allocation decision. The offloading decision includes UAV offloading with enough energy to support offloading task execution and local offloading with insufficient energy to support offloading task execution. Based on the constructed models, an optimization function and a constraint condition for the optimization function are constructed, and optimal offloading decision, optimal caching decision and optimal resource allocation decision are obtained by solving the optimization function. When the UAV receives a task offloading request from an offloading user, it is queried whether input data of an offloading task corresponding to the task offloading request is cached in the UAV. When the input data of the offloading task corresponding to the task offloading request is cached in the UAV, the offloading user is not required to be informed to upload the input data of the offloading task, and the offloading task is directly processed according to the optimal resource allocation decision. When the input data of the offloading task corresponding to the task offloading request is not cached in the UAV, the offloading user is informed to upload the input data of the offloading task, and the offloading task is processed according to the optimal resource allocation decision. The method of the present disclosure solves the technical problems that an edge computing task of the UAV does not consider a limited energy of the UAV, an offloading task may not be processed, and a subjective offloading willingness of a user is ignored under the risk of download failure.

Figure 2:
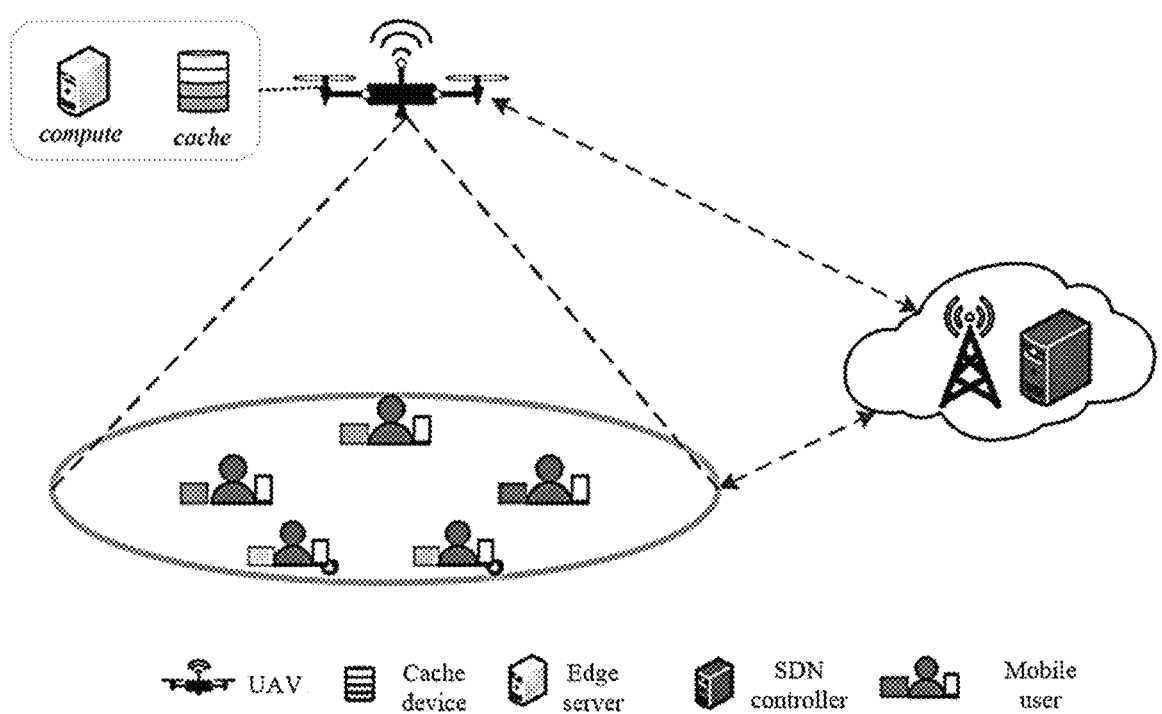
FIG. 2 illustrates a schematic structural diagram of a system for processing offloading tasks of a UAV based on an edge computing scenario according to an embodiment of the present disclosure.

In order to facilitate understanding, please refer to FIG. 2, an embodiment of the present disclosure provides a system for processing offloading tasks of a UAV based on an edge computing scenario, and the system includes the UAV, an SDN controller, and an edge server.

The UAV is equipped with the SDN controller and the edge server.

The SDN controller is configured to:
  obtain information of mobile users in a coverage area of the UAV;
  construct an offloading task model, an offloading task decision model, an offloading task delay calculation model in different offloading scenarios and an offloading task user satisfaction model based on a prospect theory according to the information of the mobile users, the offloading task decision model includes offloading decisions, caching decisions and resource allocation decisions, and the offloading decisions include UAV offloading with an enough energy to support the offloading task execution and local offloading with an insufficient energy to support offloading task execution;
  construct an optimization function based on the offloading decisions, the caching decisions and the resource allocation decisions and a constraint condition of the optimization function according to the offloading task model, the offloading task decision model, the offloading task delay calculation model in different offloading scenarios and the offloading task user satisfaction model based on the prospect theory; and
  solve the optimization function to obtain an optimal offloading decision, an optimal caching decision and an optimal resource allocation decision, send the optimal caching decision and the optimal resource allocation decision to the UAV, and send the optimal offloading decision to an offloading user, the optimal caching decision includes caching input data of the offloading tasks and not caching input data of the offloading tasks.

The UAV is configured to:
  in response to the UAV having received a task offloading request from the offloading user, inquire whether the input data of the offloading task corresponding to the task offloading request has been cached in the UAV;
  in response to the input data of the offloading task corresponding to the task offloading request having been cached in the UAV, inform the offloading user that it is unnecessary to upload the input data of the offloading task to the UAV, and process, the offloading task according to the optimal resource allocation decision through the edge server mounted on the UAV;
  in response to the input data of the offloading task corresponding to the task offloading request having not been cached in the UAV, inform the offloading user to upload the input data of the offloading task to the UAV, and process the offloading task according to the optimal resource allocation decision through the edge server, the offloading user is a mobile user who initiates the task offloading request within the coverage area of the UAV; and
  transmit a calculation result of the offloading task to the offloading user.

In an embodiment, the offloading task model is expressed as follows:

$$T_i = \{d_i, w_i, \tau_i\}$$

where $T_i$ represents an i-th offloading task of the offloading tasks; $d_i$ represents a data size of the i-th offloading task; $w_i$ represents a complexity of the i-th offloading task; and $\tau_i$ represents a maximum tolerable deadline for the i-th offloading task;

the offloading task decision model is expressed as follows:

$$O = \{o_1, o_2, \ldots, o_i, \ldots, o_n\}$$
$$X = \{x_1, x_2, \ldots, x_i, \ldots, x_n\}$$
$$F = \{f_1^F, f_2^F, \ldots, f_i^F, \ldots, f_n^F\}$$

where O represents an offloading decision set of the offloading tasks; $o_i$ represents an offloading decision of the i-th offloading task; n represents a total number of the offloading tasks; X represents a caching decision set of the offloading tasks; $x_i$ represents a caching decision of the i-th offloading task; F represents a resource allocation decision set of the offloading tasks; and $f_i^F$ represents a resource allocation decision allocated by the UAV to the i-th offloading task;

the offloading task delay calculation model in different offloading scenarios includes an offloading task delay calculation model in a local offloading scenario and an offloading task delay calculation model in an edge offloading scenario, and the offloading task delay calculation model in the local offloading scenario is expressed as follows:

$$T_i^L = \frac{w_i}{f_i^L}$$

where $T_i^L$ represents a computing delay of the i-th offloading task in the local offloading scenario, and $f_i^L$ represents a computing resource of a mobile user corresponding to the i-th offloading task;

the offloading task delay calculation model in the edge offloading scenario is expressed as follows:

$$T_i^{fsucc} = (1 - x_i)T_i^{trans} + T_i^{comp}$$
$$T_i^{ffail} = (1 - x_i)T_i^{trans} + T_i^L$$

where $T_i^{succ}$ represents a calculation delay when the i-th offloading task is successfully offloaded; $T_i^{ffail}$ represents a calculation delay when the i-th offloading task fails to offload; $T_i^{trans}$ represents a transmission time for uploading the i-th offloading task to the UAV; and $T_i^{comp}$ represents a calculation time of the i-th offloading task on the edge server;

the offloading task user satisfaction model based on the prospect theory is expressed as follows:

$$S_i = o_i E_i^{off} - (1 - o_i)T_i^L$$

$$E_i^{off} = \begin{cases} (\Delta x_i^{succ}), & p_{succ} \\ -\lambda(\Delta x_i^{fail})^\alpha, & p_{fail} \end{cases}$$

$$\Delta x_i^{succ} = T_i^L - T_i^{fsucc}$$

$$\Delta x_i^{fail} = T_i^{ffail} - T_i^L$$

$$p_{fail} = \begin{cases} \dfrac{\sum_i o_i}{N_{max}}, & \sum_i o_i < N_{max} \\ 1, & \sum_i o_i \geq N_{max} \end{cases}$$

where $S_i$ represents a user satisfaction for the i-th offloading task; $E_i^{off}$ represents a user prospect value function for offloading the i-th offloading task based on the prospect theory; $\Delta x_i^{succ}$ represents a user relative profit function when the i-th offloading task is offloaded successfully; $\Delta x_i^{fail}$ represents a user relative loss function when the i-th offloading task fails to offload; $\alpha$ represents a risk-sensitive factor; $\lambda$ represents a degree of aversion to loss; $p_{fail}$ represents a user perceived probability of offloading failure through a number of offloading decisions that the UAV has received; $p_{succ}$ represents a user perceived probability of successful offloading obtained through the number of offloading decisions that the UAV has received; $\Sigma_i o_i$ represents a total number of offloading tasks offloaded to the UAV; and $N_{max}$ represents a threshold of offloading failure.

In an embodiment, the optimization function based on the offloading decisions, the caching decisions and the resource allocation decisions is expressed as follows:

$$\max_{O,X,F} \sum_i S_i;$$

and the constraint condition of the optimization function is expressed as follows:

$$o_i, x_i \in \{0, 1\}, \forall i \in n$$

$$\sum_i d_i x_i \leq C_f^{max}, \forall i \in n$$

$$\sum_i o_i f_i^F \leq F_f^{max}, \forall i \in n$$

$$o_i \|P_f - P_i\| \leq R_f^{max}, \forall i \in n$$

$$T_i^{fsucc} \leq T_i^L, \forall i \in n$$

where $C_f^{max}$ represents a maximum storage capacity of the edge server carried by the UAV; $F_f^{max}$ represents a maximum computing capacity of the edge server carried by the UAV; $f_i^F$ represents a computing resource allocated by the UAV to the i-th offloading task; $P_f$ represents a position of the UAV; $P_i$ represents a position of an offloading user; $\|P_f - P_i\|$ represents a distance between the UAV and the offloading user; and $R_f^{max}$ represents a maximum coverage of the UAV.

In an embodiment, a process for solving the optimization function includes:

decoupling, by the SDN controller, the optimization function into an objective function of an offloading decision sub-problem, an objective function of a caching decision sub-problem and an objective function of a resource allocation decision sub-problem by using a block coordinate descent method; and solving the objective function of the offloading decision sub-problem, the objective function of the caching decision sub-problem and the objective function of the resource allocation decision sub-problem.

In an embodiment, the objective function of the offloading decision sub-problem is solved by using a genetic algorithm, the objective function of the caching decision sub-problem is solved by using a dynamic programming algorithm, and the objective function of the resource allocation decision sub-problem is solved by using a CVX solver.

The system for processing the offloading tasks of the UAV based on the edge computing scenario provided by the present disclosure is used for executing the method for processing the offloading tasks of the UAV based on the edge computing scenario provided by the present disclosure, and its principle and obtained technical effects are the same as those of the method for processing the offloading tasks of the UAV based on the edge computing scenario provided by the present disclosure, so the details are not repeated herein.

As mentioned above, the above embodiments are merely used to illustrate the technical solutions of the present disclosure, but not intended to limit thereto. Although the present disclosure has been described in detail with reference to the foregoing embodiments, those skilled in the art should understand that it is still possible to modify the technical solutions described in the foregoing embodiments, or to replace some technical features with equivalents. Further, these modifications or substitutions do not make the essence of the corresponding technical solutions deviate from the spirit and scope of the technical solutions of various embodiments of the present disclosure.

What is claimed is:

1. A method for processing offloading tasks of an unmanned aerial vehicle (UAV) based on an edge computing scenario, comprising:

obtaining, by a software-defined networking (SDN) controller carried by the UAV, information of mobile users in a coverage area of the UAV;

constructing an offloading task model, an offloading task decision model, an offloading task delay calculation model in different offloading scenarios and an offloading task user satisfaction model based on a prospect theory, by the SDN controller according to the information of the mobile users, wherein the offloading task decision model comprises offloading decisions, caching decisions and resource allocation decisions, and the offloading decisions comprise UAV offloading with an enough energy to support the offloading task execution and local offloading with an insufficient energy to support offloading task execution;

constructing an optimization function based on the offloading decisions, the caching decisions and the resource allocation decisions and a constraint condition of the optimization function, by the SDN controller based on the offloading task model, the offloading task decision model, the offloading task delay calculation model in the different offloading scenarios and the offloading task user satisfaction model based on the prospect theory;

solving, by the SDN controller, the optimization function to obtain an optimal offloading decision, an optimal caching decision and an optimal resource allocation decision, sending, by the SDN controller, the optimal caching decision and the optimal resource allocation decision to the UAV, and sending, by the SDN controller, the optimal offloading decision to an offloading user, wherein the optimal caching decision comprises caching input data of the offloading tasks and not caching input data of the offloading tasks;

in response to the UAV having received a task offloading request from the offloading user, inquiring, by the UAV, whether the input data of the offloading task corresponding to the task offloading request has been cached in the UAV; in response to the input data of the offloading task corresponding to the task offloading request having been cached in the UAV, informing, by the UAV, the offloading user that it is unnecessary to upload the input data of the offloading task to the UAV, and processing, by an edge server mounted on the UAV, the offloading task according to the optimal resource allocation decision; in response to the input data of the offloading task corresponding to the task offloading request having not been cached in the UAV, informing, by the UAV, the offloading user to upload the input data of the offloading task to the UAV, and processing, by the edge server, the offloading task according to the optimal resource allocation decision, wherein the offloading user is a mobile user who initiates the task offloading request within the coverage area of the UAV; and transmitting, by the UAV, a calculation result of the offloading task to the offloading user;

wherein the offloading task model is expressed as follows:

$$T_i = \{d_i, w_i, \tau_i\}$$

where $T_1$ represents an i-th offloading task of the offloading tasks; $d_i$ represents a data size of the i-th offloading task; $w_i$ represents a complexity of the i-th offloading task; and $\tau_i$ represents a maximum tolerable deadline for the i-th offloading task;

wherein the offloading task decision model is expressed as follows:

$$O = \{o_1, o_2, \ldots, o_i, \ldots, o_n\}$$
$$X = \{x_1, x_2, \ldots, x_i, \ldots, x_n\}$$
$$F = \{f_1^F, f_2^F, \ldots, f_i^F, \ldots, f_n^F\}$$

where O represents an offloading decision set of the offloading tasks; $o_i$ represents an offloading decision of the i-th offloading task; when an energy of the UAV is enough to complete the i-th offloading task, and the i-th offloading task is offloaded to the UAV, $o_i=1$; when the energy of the UAV is likely to be not enough to complete the i-th offloading task, there is a risk of task offloading failure, and the i-th offloading task is calculated locally by a corresponding mobile user, $o_i=0$; n represents a total number of the offloading tasks; X represents a caching decision set of the offloading tasks; $x_i$ represents a caching decision of the i-th offloading task; when input data of the i-th offloading task is cached in the UAV, $x_i=1$; when the input data of the i-th offloading task is not cached in the UAV, $x_i=0$; F represents a resource allocation decision set of the offloading tasks; and $f_i^F$ represents a resource allocation decision allocated by the UAV to the i-th offloading task;

wherein the offloading task delay calculation model in different offloading scenarios comprises an offloading task delay calculation model in a local offloading scenario and an offloading task delay calculation model in an edge offloading scenario, and the offloading task delay calculation model in the local offloading scenario is expressed as follows:

$$T_i^L = \frac{w_i}{f_i^L}$$

where $T_i^L$ represents a computing delay of the i-th offloading task in the local offloading scenario, and $f_i^L$ represents a computing resource of a mobile user corresponding to the i-th offloading task;

wherein the offloading task delay calculation model in the edge offloading scenario is expressed as follows:

$$T_i^{fsucc} = (1 - x_i)T_i^{trans} + T_i^{comp}$$
$$T_i^{ffail} = (1 - x_i)T_i^{trans} + T_i^L$$

where $T_i^{fsucc}$ represents a calculation delay when the i-th offloading task is successfully offloaded; $T_i^{ffail}$ represents a calculation delay when the i-th offloading task fails to offload; $T_i^{trans}$ represents a transmission time for uploading the i-th offloading task to the UAV; and $T_i^{comp}$ represents a calculation time of the i-th offloading task on the edge server;

wherein the offloading task user satisfaction model based on the prospect theory is expressed as follows:

$$S_i = o_i E_i^{off} - (1 - o_i)T_i^L$$
$$E_i^{off} = \begin{cases} (\Delta x_i^{succ}), & p_{succ} \\ -\lambda(\Delta x_i^{fail})^\alpha, & p_{fail} \end{cases}$$
$$\Delta x_i^{succ} = T_i^L - T_i^{fsucc}$$
$$\Delta x_i^{fail} = T_i^{ffail} - T_i^L$$
$$p_{fail} = \begin{cases} \dfrac{\sum_i o_i}{N_{max}}, & \sum_i o_i < N_{max} \\ 1, & \sum_i o_i \geq N_{max} \end{cases}$$

where $S_i$ represents a user satisfaction for the i-th offloading task; $E_i^{off}$ represents a user prospect value function for offloading the i-th offloading task based on the prospect theory; $\Delta x_i^{succ}$ represents a user relative profit function when the i-th offloading task is offloaded successfully; $\Delta x_i^{fail}$ represents a user relative loss function when the i-th offloading task fails to offload; α represents a risk-sensitive factor; a represents a degree of aversion to loss; $p_{fail}$ represents a user perceived probability of offloading failure through a number of offloading decisions that the UAV has received; $p_{succ}$ represents a user perceived probability of successful offloading obtained through the number of offloading decisions that the UAV has received; $\Sigma_i o_i$ represents a total number of offloading tasks offloaded to the UAV; and $N_{max}$ represents a threshold of offloading failure; and wherein the optimization function based on the offloading decisions, the caching decisions and the resource allocation decisions is expressed as follows:

$$\max_{O,X,F} \sum_i S_i;$$

and wherein the constraint condition of the optimization function is expressed as follows:

$$o_i, x_i \in \{0, 1\}, \forall i \in n$$

$$\sum_i d_i x_i \leq C_f^{max}, \forall i \in n$$

$$\sum_i o_i f_i^F \leq F_f^{max}, \forall i \in n$$

$$o_i \|P_f - P_i\| \leq R_f^{max}, \forall i \in n$$

$$T_i^{fsucc} \leq T_i^L, \forall i \in n$$

where $C_f^{max}$ represents a maximum storage capacity of the edge server carried by the UAV; $F_f^{max}$ represents a maximum computing capacity of the edge server carried by the UAV; $f_i^F$ represents a computing resource allocated by the UAV to the i-th offloading task; $P_f$ represents a position of the UAV; $P_i$ represents a position of an offloading user; $\|P_f - P_i\|$ represents a distance between the UAV and the offloading user; and $R_f^{max}$ represents a maximum coverage of the UAV.

2. The method for processing the offloading tasks of the UAV based on the edge computing scenario as claimed in claim 1, wherein the solving, by the SDN controller, the optimization function comprises:

decoupling, by the SDN controller, the optimization function into an objective function of an offloading decision sub-problem, an objective function of a caching decision sub-problem and an objective function of a resource allocation decision sub-problem by using a block coordinate descent method; and solving the objective function of the offloading decision sub-problem, the objective function of the caching decision sub-problem and the objective function of the resource allocation decision sub-problem.

3. The method for processing the offloading tasks of the UAV based on the edge computing scenario as claimed in claim 2, wherein the solving the objective function of the offloading decision sub-problem, the objective function of the caching decision sub-problem and the objective function of the resource allocation decision sub-problem comprises:

solving the objective function of the offloading decision sub-problem by using a genetic algorithm;

solving the objective function of the caching decision sub-problem by using a dynamic programming algorithm; and solving the objective function of the resource allocation decision sub-problem by using a convex optimization (CVX) solver.

4. A system for processing offloading tasks of a UAV based on an edge computing scenario, wherein the system comprises the UAV, an SDN controller, and an edge server;

wherein the UAV is equipped with the SDN controller and the edge server;

wherein the SDN controller is configured to:

obtain information of mobile users in a coverage area of the UAV;

construct an offloading task model, an offloading task decision model, an offloading task delay calculation model in different offloading scenarios and an offloading task user satisfaction model based on a prospect theory according to the information of the mobile users, wherein the offloading task decision model comprises offloading decisions, caching decisions and resource allocation decisions, and the offloading decisions comprise UAV offloading with an enough energy to support the offloading task execution and local offloading with an insufficient energy to support offloading task execution;

construct an optimization function based on the offloading decisions, the caching decisions and the resource allocation decisions and a constraint condition of the optimization function according to the offloading task model, the offloading task decision model, the offloading task delay calculation model in different offloading scenarios and the offloading task user satisfaction model based on the prospect theory; and solve the optimization function to obtain an optimal offloading decision, an optimal caching decision and an optimal resource allocation decision, send the optimal caching decision and the optimal resource allocation decision to the UAV, and send the optimal offloading decision to an offloading user, wherein the optimal caching decision comprises caching input data of the offloading tasks and not caching input data of the offloading tasks; and wherein the UAV is configured to:

in response to the UAV having received a task offloading request from the offloading user, inquire whether the input data of the offloading task corresponding to the task offloading request has been cached in the UAV;

in response to the input data of the offloading task corresponding to the task offloading request having been cached in the UAV, inform the offloading user that it is unnecessary to upload the input data of the offloading task to the UAV, and process, the offloading task according to the optimal resource allocation decision through the edge server mounted on the UAV;

in response to the input data of the offloading task corresponding to the task offloading request having not been cached in the UAV, inform the offloading user to upload the input data of the offloading task to the UAV, and process the offloading task according to the optimal resource allocation decision through the edge server, wherein the offloading user is a mobile user who initiates the task offloading request within the coverage area of the UAV; and transmit a calculation result of the offloading task to the offloading user;

wherein the offloading task model is expressed as follows:

$$T_i = \{d_i, w_i, \tau_i\}$$

where $T_i$ represents an i-th offloading task of the offloading tasks; $d_i$ represents a data size of the i-th offloading task; $w_i$ represents a complexity of the i-th offloading task; and $\tau_i$ represents a maximum tolerable deadline for the i-th offloading task;

wherein the offloading task decision model is expressed as follows:

$$O = \{o_1, o_2, \ldots, o_i, \ldots, o_n\}$$
$$X = \{x_1, x_2, \ldots, x_i, \ldots, x_n\}$$
$$F = \{f_1^F, f_2^F, \ldots, f_i^F, \ldots, f_n^F\}$$

where O represents an offloading decision set of the offloading tasks; $o_i$ represents an offloading decision of the i-th offloading task; when an energy of the UAV is enough to complete the i-th offloading task, and the i-th offloading task is offloaded to the UAV, $o_i=1$; when the energy of the UAV is likely to be not enough to complete the i-th offloading task, there is a risk of task offloading failure, and the i-th offloading task is calculated locally by a corresponding mobile user, $o_i=0$; n represents a total number of the offloading tasks; X represents a caching decision set of the offloading tasks; $x_i$ represents a caching decision of the i-th offloading task; when input data of the i-th offloading task is cached in the UAV, $x_i=1$; when the input data of the i-th offloading task is not cached in the UAV, $x_i=0$; F represents a resource allocation decision set of the offloading tasks; and $f_i^F$ represents a resource allocation decision allocated by the UAV to the i-th offloading task;

wherein the offloading task delay calculation model in different offloading scenarios comprises an offloading task delay calculation model in a local offloading scenario and an offloading task delay calculation model in an edge offloading scenario, and the offloading task delay calculation model in the local offloading scenario is expressed as follows:

$$T_i^L = \frac{w_i}{f_i^L}$$

where $T_i^L$ represents a computing delay of the i-th offloading task in the local offloading scenario, and $f_i^L$ represents a computing resource of a mobile user corresponding to the i-th offloading task;

wherein the offloading task delay calculation model in the edge offloading scenario is expressed as follows:

$$T_i^{fsucc} = (1 - x_i)T_i^{trans} + T_i^{comp}$$
$$T_i^{ffail} = (1 - x_i)T_i^{trans} + T_i^L$$

where $T_i^{fsucc}$ represents a calculation delay when the i-th offloading task is successfully offloaded; $T_i^{ffail}$ represents a calculation delay when the i-th offloading task fails to offload; $T_i^{trans}$ represents a transmission time for uploading the i-th offloading task to the UAV; and $T_i^{comp}$ represents a calculation time of the i-th offloading task on the edge server;

wherein the offloading task user satisfaction model based on the prospect theory is expressed as follows:

$$S_i = o_i E_i^{off} - (1 - o_i)T_i^L$$

$$E_i^{off} = \begin{cases} (\Delta x_i^{succ}), & p_{succ} \\ -\lambda(\Delta x_i^{fail})^\alpha, & p_{fail} \end{cases}$$

$$\Delta x_i^{succ} = T_i^L - T_i^{fsucc}$$

$$\Delta x_i^{fail} = T_i^{ffail} - T_i^L$$

$$p_{fail} = \begin{cases} \dfrac{\sum_i o_i}{N_{max}}, & \sum_i o_i < N_{max} \\ 1, & \sum_i o_i \geq N_{max} \end{cases}$$

where $S_i$ represents a user satisfaction for the i-th offloading task; $E_i^{off}$ represents a user prospect value function for offloading the i-th offloading task based on the prospect theory; $\Delta x_i^{succ}$ represents a user relative profit function when the i-th offloading task is offloaded successfully; $\Delta x_i^{fail}$ represents a user relative loss function when the i-th offloading task fails to offload; $\alpha$ represents a risk-sensitive factor; $\lambda$ represents a degree of aversion to loss; $p_{fail}$ represents a user perceived probability of offloading failure through a number of offloading decisions that the UAV has received; $p_{succ}$ represents a user perceived probability of successful offloading obtained through the number of offloading decisions that the UAV has received; $\Sigma_i o_i$ represents a total number of offloading tasks offloaded to the UAV; and $N_{max}$ represents a threshold of offloading failure;

wherein the optimization function based on the offloading decisions, the caching decisions and the resource allocation decisions is expressed as follows:

$$\max_{O,X,F} \sum_i S_i;$$

and wherein the constraint condition of the optimization function is expressed as follows:

$$o_i, x_i \in \{0, 1\}, \forall i \in n$$
$$\sum_i d_i x_i \leq C_f^{max}, \forall i \in n$$
$$\sum_i o_i f_i^F \leq F_f^{max}, \forall i \in n$$
$$o_i \|P_f - P_i\| \leq R_f^{max}, \forall i \in n$$
$$T_i^{fsucc} \leq T_i^L, \forall i \in n$$

where $C_f^{max}$ represents a maximum storage capacity of the edge server carried by the UAV; $F_f^{max}$ represents a maximum computing capacity of the edge server carried by the UAV; $f_i^F$ represents a computing resource allocated by the UAV to the i-th offloading task; $P_f$ represents a position of the UAV; P represents a position of an offloading user; $\|P_f - P_i\|$ represents a distance between the UAV and the offloading user; and $R_f^{max}$ represents a maximum coverage of the UAV.

5. The system for processing the offloading tasks of the UAV based on the edge computing scenario as claimed in claim 4, wherein a process for solving the optimization function comprises:
  decoupling, by the SDN controller, the optimization function into an objective function of an offloading decision sub-problem, an objective function of a caching decision sub-problem and an objective function of a resource allocation decision sub-problem by using a block coordinate descent method; and
  solving the objective function of the offloading decision sub-problem, the objective function of the caching decision sub-problem and the objective function of the resource allocation decision sub-problem.

6. The system for processing the offloading tasks of the UAV based on the edge computing scenario as claimed in claim 5, wherein the objective function of the offloading decision sub-problem is solved by using a genetic algorithm, the objective function of the caching decision sub-problem is solved by using a dynamic programming algorithm, and the objective function of the resource allocation decision sub-problem is solved by using a CVX solver.

7. A method for processing offloading tasks of an unmanned aerial vehicle (UAV) based on an edge computing scenario, comprising:
  obtaining, by a software-defined networking (SDN) controller carried by the UAV, information of mobile users in a coverage area of the UAV;
  constructing an offloading task model, an offloading task decision model, an offloading task delay calculation model in different offloading scenarios and an offloading task user satisfaction model based on a prospect theory, by the SDN controller according to the information of the mobile users, wherein the offloading task decision model comprises offloading decisions, caching decisions and resource allocation decisions, and the offloading decisions comprise UAV offloading with an enough energy to support the offloading task execution and local offloading with an insufficient energy to support offloading task execution;
  constructing an optimization function based on the offloading decisions, the caching decisions and the resource allocation decisions and a constraint condition of the optimization function, by the SDN controller based on the offloading task model, the offloading task decision model, the offloading task delay calculation model in the different offloading scenarios and the offloading task user satisfaction model based on the prospect theory;
  solving, by the SDN controller, the optimization function to obtain an optimal offloading decision, an optimal caching decision and an optimal resource allocation decision, sending, by the SDN controller, the optimal caching decision and the optimal resource allocation decision to the UAV, and sending, by the SDN controller, the optimal offloading decision to an offloading user, wherein the optimal caching decision comprises caching input data of the offloading tasks and not caching input data of the offloading tasks;
  in response to the UAV having received a task offloading request from the offloading user, inquiring, by the UAV, whether the input data of the offloading task corresponding to the task offloading request has been cached in the UAV; in response to the input data of the offloading task corresponding to the task offloading request having been cached in the UAV, informing, by the UAV, the offloading user that it is unnecessary to upload the input data of the offloading task to the UAV, and processing, by an edge server mounted on the UAV, the offloading task according to the optimal resource allocation decision; in response to the input data of the offloading task corresponding to the task offloading request having not been cached in the UAV, informing, by the UAV, the offloading user to upload the input data of the offloading task to the UAV, and processing, by the edge server, the offloading task according to the optimal resource allocation decision, wherein the offloading user is a mobile user who initiates the task offloading request within the coverage area of the UAV; and
  transmitting, by the UAV, a calculation result of the offloading task to the offloading user;
  wherein the offloading task model is expressed as follows:

$$T_i = \{d_i, w_i, \tau_i\}$$

where $T_i$ represents an i-th offloading task of the offloading tasks; $d_i$ represents a data size of the i-th offloading task; $w_i$ represents a complexity of the i-th offloading task; and $\tau_i$ represents a maximum tolerable deadline for the i-th offloading task;
  wherein the offloading task decision model is expressed as follows:

$$O = \{o_1, o_2, \ldots, o_i, \ldots, o_n\}$$
$$X = \{x_1, x_2, \ldots, x_i, \ldots, x_n\}$$
$$F = \{f_1^F, f_2^F, \ldots, f_i^F, \ldots, f_n^F\}$$

where O represents an offloading decision set of the offloading tasks; $o_i$ represents an offloading decision of the i-th offloading task; when an energy of the UAV is enough to complete the i-th offloading task, and the i-th offloading task is offloaded to the UAV, $o_i=1$; when the energy of the UAV is likely to be not enough to complete the i-th offloading task, there is a risk of task offloading failure, and the i-th offloading task is calculated locally by a corresponding mobile user, $o_i=0$; n represents a total number of the offloading tasks; X represents a caching decision set of the offloading tasks; $x_i$ represents a caching decision of the i-th offloading task; when input data of the i-th offloading task is cached in the UAV, $x_i=1$; when the input data of the i-th offloading task is not cached in the UAV, $x_i=0$; F represents a resource allocation decision set of the offloading tasks; and $f_i^F$ represents a resource allocation decision allocated by the UAV to the i-th offloading task;
  wherein the offloading task delay calculation model in different offloading scenarios comprises an offloading task delay calculation model in a local offloading scenario and an offloading task delay calculation model in an edge offloading scenario, and the offloading task delay calculation model in the local offloading scenario is expressed as follows:

$$T_i^L = \frac{w_i}{f_i^L}$$

where $T_i^L$ represents a computing delay of the i-th offloading task in the local offloading scenario, and $f_i^L$ represents a computing resource of a mobile user corresponding to the i-th offloading task;

wherein the offloading task delay calculation model in the edge offloading scenario is expressed as follows:

$$T_i^{fsucc} = (1 - x_i)T_i^{trans} + T_i^{comp}$$

$$T_i^{ffail} = (1 - x_i)T_i^{trans} + T_i^L$$

where $T_i^{fsucc}$ represents a calculation delay when the i-th offloading task is successfully offloaded; $T_i^{ffail}$ represents a calculation delay when the i-th offloading task fails to offload; $T_i^{trans}$ represents a transmission time for uploading the i-th offloading task to the UAV; and $T_i^{comp}$ represents a calculation time of the i-th offloading task on the edge server;

wherein the offloading task user satisfaction model based on the prospect theory is expressed as follows:

$$S_i = o_i E_i^{off} - (1 - o_i)T_i^L$$

$$E_i^{off} = \begin{cases} (\Delta x_i^{succ}), & p_{succ} \\ -\lambda(\Delta x_i^{fail})^\alpha, & p_{fail} \end{cases}$$

$$\Delta x_i^{succ} = T_i^L - T_i^{fsucc}$$

$$\Delta x_i^{fail} = T_i^{ffail} - T_i^L$$

$$p_{fail} = \begin{cases} \dfrac{\sum_i o_i}{N_{max}}, & \sum_i o_i < N_{max} \\ 1, & \sum_i o_i \geq N_{max} \end{cases}$$

where $S_i$ represents a user satisfaction for the i-th offloading task; $E_i^{off}$ represents a user prospect value function for offloading the i-th offloading task based on the prospect theory; $\Delta x_i^{succ}$ represents a user relative profit function when the i-th offloading task is offloaded successfully; $\Delta x_i^{fail}$ represents a user relative loss function when the i-th offloading task fails to offload; $\alpha$ represents a risk-sensitive factor; $\lambda$ represents a degree of aversion to loss; $p_{fail}$ represents a user perceived probability of offloading failure through a number of offloading decisions that the UAV has received; $p_{succ}$ represents a user perceived probability of successful offloading obtained through the number of offloading decisions that the UAV has received; $\Sigma_i o_i$ represents a total number of offloading tasks offloaded to the UAV; and $N_{max}$ represents a threshold of offloading failure;

wherein the optimization function based on the offloading decisions, the caching decisions and the resource allocation decisions is expressed as follows:

$$\max_{O,X,F} \sum_i S_i; \text{ and}$$

and wherein the constraint condition of the optimization function is expressed as follows:

$$o_i, x_i \in \{0, 1\}, \forall i \in n$$

$$\sum_i d_i x_i \leq C_f^{max}, \forall i \in n$$

$$\sum_i o_i f_i^F \leq F_f^{max}, \forall i \in n$$

$$o_i \|P_f - P_i\| \leq R_f^{max}, \forall i \in n$$

$$T_i^{fsucc} \leq T_i^L, \forall i \in n$$

where $C_f^{max}$ represents a maximum storage capacity of the edge server carried by the UAV; $F_f^{max}$ represents a maximum computing capacity of the edge server carried by the UAV; $f_i^F$ represents a computing resource allocated by the UAV to the i-th offloading task; $P_f$ represents a position of the UAV; $P_i$ represents a position of an offloading user; $\|P_f - P_i\|$ represents a distance between the UAV and the offloading user; and $R_f^{max}$ represents a maximum coverage of the UAV;

wherein a preset cache decision is expressed as $\grave{X}$ and a preset resource allocation decision is expressed as $\grave{F}$, and the optimal offloading decision O is obtained by solving an offloading decision sub-problem $P_1$;

wherein the offloading decision sub-problem $P_1$ is expressed as follows:

$$\max_{O,\grave{X},\grave{F}} \sum_i S_i$$

$$o_i, x_i \in \{0, 1\} \forall i \in n$$

$$\sum_i o_i f_i^F \leq F_f^{max}, \forall i \in n$$

$$o_i \|P_f - P_i\| \leq R_f^{max}, \forall i \in n$$

where the offloading decision sub-problem $P_1$ is a 0-1 integer nonlinear programming problem, the optimal offloading decision O is a non-convex function, and a genetic algorithm is used to solve the offloading decision sub-problem $P_1$;

wherein a preset offloading decision is expressed as $\grave{O}$, and the optimal cache decision X is obtained by solving a caching decision sub-problem $P_2$;

wherein the caching decision sub-problem $P_2$ is expressed as follows:

$$\max_{\grave{O},\grave{X},\grave{F}} \sum_i S_i$$

$$\sum_i d_i x_i \leq C_f^{max}, \forall i \in n$$

$$T_i^{fsucc} \leq T_i^L, \forall i \in n$$

where the caching decision sub-problem $P_2$ is a 0-1 knapsack problem, and a dynamic programming algorithm is used to solve the caching decision sub-problem $P_2$; and wherein a preset offloading decision is expressed as $\grave{O}$, a resource allocation sub-problem $P_3$ is solved to obtain the optimal resource allocation decision F, and the resource allocation sub-problem $P_3$ is expressed as follows:

$$\max_{\dot{O},\dot{X},\dot{F}} \sum_i S_i$$
$$\sum_i o_i f_i^F \leq F_f^{max}, \forall i \in n$$
$$T_i^{fsucc} \leq T_i^L, \forall i \in n$$

where after the offloading decision and the caching decision are preset, the resource allocation sub-problem $P_3$ is a convex problem, and the optimal resource allocation decision F is obtained by using a convex optimization (CVX) solver.

\* \* \* \* \*